United States Patent
Akiyoshi

(10) Patent No.: US 9,474,001 B2
(45) Date of Patent: Oct. 18, 2016

(54) COMMUNICATION SYSTEM, ACCESS CONTROL APPARATUS, ACCESS APPARATUS, AND COMMUNICATION PATH CONTROL METHOD THEREFOR

(71) Applicant: NEC Corporation, Tokyo (JP)

(72) Inventor: Ippei Akiyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/391,141

(22) PCT Filed: May 20, 2013

(86) PCT No.: PCT/JP2013/003184
§ 371 (c)(1),
(2) Date: Oct. 7, 2014

(87) PCT Pub. No.: WO2013/175755
PCT Pub. Date: Nov. 28, 2013

(65) Prior Publication Data
US 2015/0099518 A1    Apr. 9, 2015

(30) Foreign Application Priority Data

May 23, 2012  (JP) ................................. 2012-117069

(51) Int. Cl.
*H04W 36/30* (2009.01)
*H04W 36/24* (2009.01)
(Continued)

(52) U.S. Cl.
CPC ........... *H04W 36/245* (2013.01); *H04W 36/32* (2013.01); *H04W 52/0209* (2013.01); *H04W52/0254* (2013.01); *H04W 52/0258* (2013.01); *H04W 76/046* (2013.01); *H04W 76/068* (2013.01); *Y02B 60/50* (2013.01)

(58) Field of Classification Search
CPC . H04W 36/245; H04W 36/32; H04W 52/02; H04W 52/0209; H04W 52/0254; H04W 52/0258; H04W 76/06; Y02B 60/50

USPC .................................. 455/436; 370/331, 225
See application file for complete search history.

(56) References Cited

U.S. PATENT DOCUMENTS 6,393,282 B1 *   5/2002   Iimori ................... H04W 36/32
                                                                    455/432.1
2011/0223914 A1    9/2011   Hashimoto
(Continued)

FOREIGN PATENT DOCUMENTS

WO    WO 2011/129273 A1    10/2011

OTHER PUBLICATIONS

"General Packet Radio Service (GPRS) enhancements for Evolved Universal Terrestrial Radio Access Network (E-UTRAN) access" (3GPP TS 23.401 V10.6.0) (Dec. 2011).
(Continued)

*Primary Examiner* — Kamran Afshar
*Assistant Examiner* — Farid Seyedvosoghi
(74) *Attorney, Agent, or Firm* — McGinn IP Law Group, PLLC

(57) ABSTRACT

In an access apparatus which has an offloading function, resources of the access apparatus are excessively consumed when handover occurs between access apparatuses. A communication system (1) according to the present invention includes an access apparatus (access functions (11, 12)) including means for terminating a communication path with a communication terminal (50), and an access control apparatus (access GW function (C-plane) (20)) that controls the access apparatus. The communication system (1) according to the present invention includes determination means (communication terminal management function (20*a*)) for determining whether or not to prompt a switching process of the communication path in accordance with a movement history of the communication terminal (50) based on an operation state of the communication terminal (50).

26 Claims, 9 Drawing Sheets

(51) Int. Cl.
  *H04W 36/32*  (2009.01)
  *H04W 52/02*  (2009.01)
  *H04W 76/04*  (2009.01)
  *H04W 76/06*  (2009.01)

(56) References Cited

U.S. PATENT DOCUMENTS

| | | |
|---|---|---|
| 2011/0274087 A1 | 11/2011 | Liang et al. |
| 2012/0218973 A1* | 8/2012 | Du .................. H04W 36/14 370/331 |
| 2013/0034057 A1 | 2/2013 | Aramoto et al. |
| 2014/0376363 A1* | 12/2014 | Park .................. H04W 36/0055 370/225 |

OTHER PUBLICATIONS

"Key Issues to be Considered for HSPA+LTE Aggregation", 3GPP TSG-RAN WG2 meeting #75 R2-113904, Aug. 26, 2011, pp. 1-7.
International Search Report (Isr) (PCT Form PCT/ISA/210), in PCT/JP2013/003184 dated Aug. 20, 2013.
Extended European Search Report dated Dec. 22, 2015.

* cited by examiner

COMMUNICATION SYSTEM, ACCESS CONTROL APPARATUS, ACCESS APPARATUS, AND COMMUNICATION PATH CONTROL METHOD THEREFOR

TECHNICAL FIELD

The present invention relates to a communication system, an access control apparatus, an access apparatus and a communication path control method therefor, and in particular, to a control method for a communication path terminated in an access device.

BACKGROUND ART

An example of a communication system related to the invention is described in Non-Patent Literature 1 below. As shown in FIG. 6, this communication system 100 includes a EUTRAN (Evolved Universal Terrestrial Radio Access Network) 110, an MME (Mobility Management Entity) 120, a Serving GW (Gateway) 130, and a PDN (Packet Data Networks) GW 140.

The EUTRAN 110 is a radio access network which provides a communication terminal with connectivity to the communication system 100 using a radio access method referred to as LTE (Long Term Evolution) and includes eNBs (evolved Node B) 111 and 112.

The eNBs 111 and 112 are radio access apparatuses which provide the communication terminal with connectivity to the communication system 100 using LTE. The MME 120 is a control apparatus for performing control so that the communication terminal can receive mobile services via the eNB such as authentication and handover between eNBs.

The Serving GW 130 is an access GW apparatus for providing a bearer that is a communication path for the communication terminal performing data communication, and establishes a tunnel for packet transfer with the eNB and the PDN GW in order to provide the bearer.

The PDN GW 140 is a mobile anchor apparatus which terminates a bearer that is a communication path for the communication terminal performing packet communication, and establishes a tunnel for packet transfer with the Serving GW 130 in order to provide the bearer.

FIG. 7 shows a procedure through which a communication terminal 50 performs handover to the eNB 111 from the state where the communication terminal 50 is attached to the eNB 112 in the communication system 100 shown in FIG. 6. It is assumed that the communication terminal 50 establishes a bearer via the eNB 112 as the initial state.

Referring to FIG. 7, the communication terminal 50 scans a radio wave environment around the communication terminal 50 itself during communication via the eNB 112 and notifies the eNB 112 connected to the communication terminal 50 itself of the scanning result by using a Measurement Report message (d1 in FIG. 7).

After the eNB 112 receives the Measurement Report message and confirms that the radio wave environment of the eNB 111 is better than that of the eNB 112 itself for the communication terminal 50, the eNB 112 determines whether the handover to the eNB 111 is possible or not (Handover Request to Handover Request Ack) (d2, d3 in FIG. 7). When it is possible, the eNB 112 notifies the communication terminal 50 that the communication terminal 50 should perform handover to the eNB 111 [RRC (Radio Resource Control) Connection Reconfiguration] (d4 in FIG. 7).

The communication terminal 50 establishes a link with the eNB 111 in accordance with the instruction from the eNB 112 (RRC Connection Reconfiguration Complete) (d6 in FIG. 7).

When the eNB 111 establishes the link with the communication terminal 50, the eNB 111 switches the bearer for the communication terminal 50 (Path Switching Request to Path Switching Request Ack) (d7 to d10 in FIG. 7).

As described above, in the communication system related to the invention, it is possible to support handover between eNBs by switching the bearer by using the Serving GW 130 and/or the PDN GW 140 as an anchor point.

However, due to an increase in mobile traffic in recent years, a technology called "traffic offloading" has attracted attention. The technology makes it possible to transfer the traffic flowing through the communication system to another communication system as soon as possible by disposing GW apparatuses such as PDN GW, Serving GW and the like, which have been disposed in the inner part of the system in the past, in positions close to the eNB in a distributed manner.

If this distributed arrangement of the GW apparatuses is promoted even further, a communication system in which the GW function is included in the eNB can be constructed. Such a communications system is shown in FIG. 8. This communication system 101 includes a EUTRAN 110 and an MME 120.

Similarly to the communication system 101 shown in FIG. 6, the EUTRAN 110 is a radio access network which provides a communication terminal with connectivity to the communication system 101 using LTE and includes eNBs 111 and 112.

The eNBs 111 and 112 are radio access apparatuses which provide the communication terminal with connectivity to the communication system 101 using LTE. In addition, the eNBs 111 and 112 include GW functions of the Serving GW 130 and the PDN GW 140 shown in FIG. 6.

The MME 120 is a control device for performing control so that the communication terminal can receive mobile services via the eNB such as authentication, inter-eNB handover and the like, as in the case of the communication system 100 shown in FIG. 6.

FIG. 9 shows a procedure through which a communication terminal 50 performs handover to the eNB 111 from the state where the communication terminal 50 is attached to the eNB 112 in the communication system 101 shown in FIG. 8. Because the general procedure in FIG. 9 is the same as that in FIG. 7, only the differences therebetween are shown hereinafter.

It is assumed that as the initial state, the communication terminal 50 establishes a bearer via the eNB 112 by using a Serving GW function and a PDN GW function in the eNB 112.

The communication terminal 50 performs handover from the eNB 112 to the eNB 111 in the same procedure as that shown in FIG. 7. In this case, it is also possible to support handover between eNBs in this system by continuously using functions of the eNB 112 as the Serving GW function and the PDN GW function that serve as anchor points (e1 to e10 in FIG. 9).

CITATION LIST

Non-Patent Literature

Non-Patent Literature 1: "General Packet Radio Service (GPRS) enhancements for Evolved Universal Terrestrial Radio Access Network (E-UTRAN) access" (3GPP TS 23.401 V10.6.0) (2011 December)

SUMMARY OF INVENTION

Technical Problem

In the above-mentioned communication system related to the invention, in eNBs having GW functions, there is a problem that resources of the eNB are excessively consumed when handover occurs between eNBs.

This is because LTE is a communication system premised on the constant connection by IP (Internet Protocol). Thus, once the communication terminal establishes the bearer, the same IP is always used. Therefore, in the communication system in which the eNB includes the GW functions, an occurrence of handover between eNBs leads to consumption of the communication resources of two eNBs, i.e., the eNB serving as an anchor and the eNB with which the communication terminal is currently connected.

Therefore, an object of the present invention is to provide a communication system, an access control apparatus, an access apparatus and a communication path control method therefor that resolve the above problem and avoid consumption of resources of a plurality of the access apparatuses for a long period just to provide a communication path to one communication terminal.

Solution to Problem

A communication system according to the present invention is a communication system including an access apparatus including means for terminating a communication path with a communication terminal, and an access control apparatus that controls the access apparatus, in which the communication system includes determination means for determining whether or not to prompt a switching process of the communication path in accordance with a movement history of the communication terminal based on an operation state of the communication terminal.

An access control apparatus according to the present invention is an access control apparatus that controls an access apparatus including means for terminating a communication path with a communication terminal, in which the access control apparatus includes determination means for determining whether or not to prompt a switching process of the communication path in accordance with a movement history of the communication terminal based on an operation state of the communication terminal.

An access apparatus according to the present invention includes:

means for terminating a communication path with a communication terminal; and determination means for determining whether or not to prompt a switching process of the communication path in accordance with a movement history of the communication terminal based on an operation state of the communication terminal.

A communication path control method according to the present invention is a communication path control method used for a communication system including an access apparatus including means for terminating a communication path with a communication terminal, and an access control apparatus that controls the access apparatus, in which the communication path control method includes determining whether or not to prompt a switching process of the communication path in accordance with a movement history of the communication terminal based on an operation state of the communication terminal.

Advantageous Effects of Invention

By the configuration and operation as described above, the present invention can achieve an advantage that a communication system capable of avoiding consumption of resources of a plurality of the access apparatuses for a long period just to provide a path to one communication terminal is provided.

DESCRIPTION OF EMBODIMENTS

Next, exemplary embodiments of the present invention are explained with reference to the drawings. Firstly, an outline of a communication system according to the present invention is explained. The communication system according to the present invention includes an access apparatus including means for terminating a communication path with a communication terminal, and an access control apparatus that controls the access apparatus.

The communication system according to the present invention includes means for determining whether or not to prompt a process of switching a termination point of the communication path with the communication terminal in accordance with the movement history of the communication terminal when the communication terminal fulfills the condition for transition to the power-saving state.

By employing the configuration as described above, the present invention can achieve an object of providing a communication system capable of avoiding consumption of resources of a plurality of the access apparatuses for a long period just to provide a path to one communication terminal.

Figure 1:
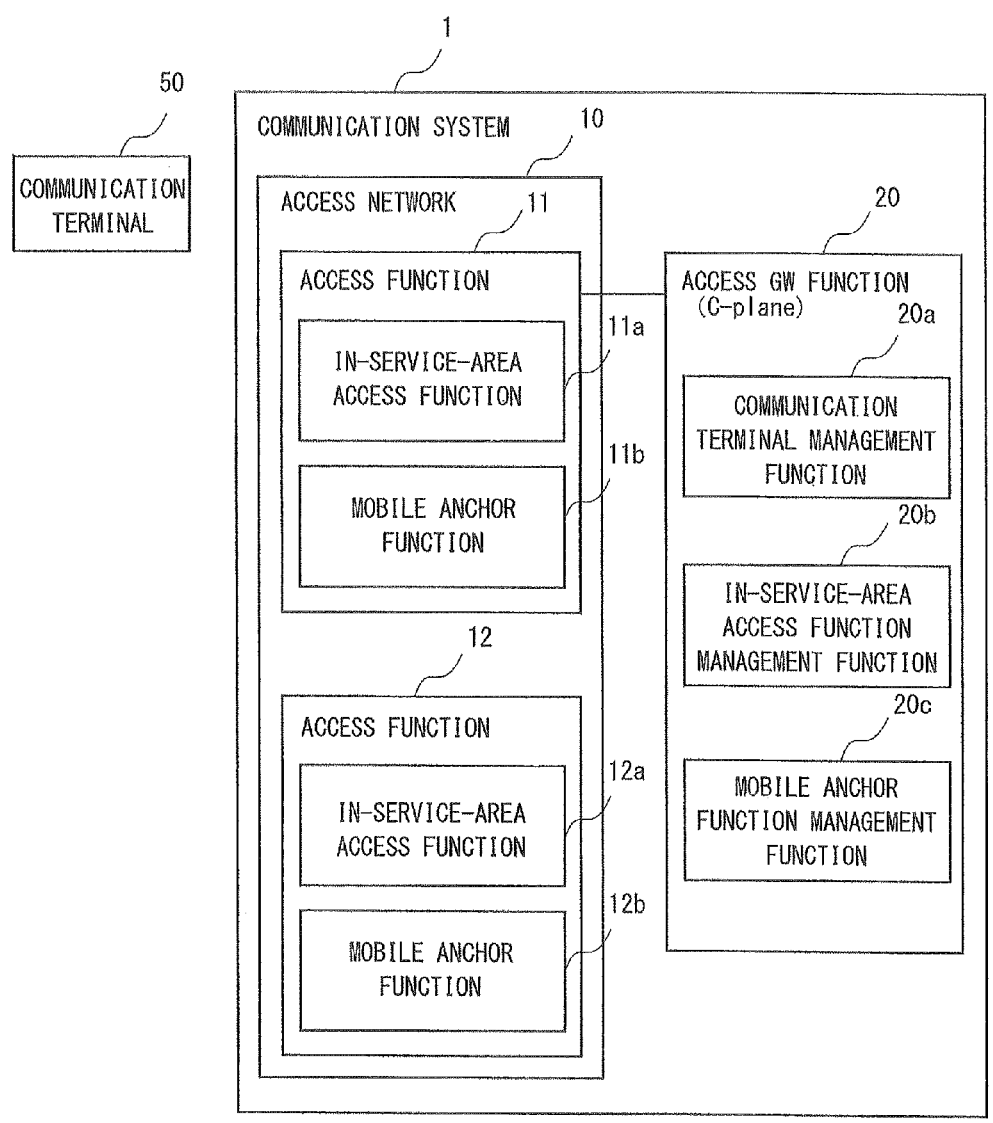
FIG. 1 is a block diagram showing a configuration example of a communication system according to a first exemplary embodiment of the present invention.

FIG. 1 is a block diagram showing a configuration example of a communication system according to a first exemplary embodiment of the present invention. In FIG. 1, this exemplary embodiment includes a communication system 1 and a communication terminal 50.

The communication system 1 includes an access network 10 and an access GW (Gateway) function (C-plane) 20. Note that the access GW function (C-plane) 20 corresponds to the access control apparatus described above.

The access network 10 is a radio access network which provides the communication terminal 50 with connectivity to the communication system 1 using a radio access method and includes access functions 11-12. Note that the access functions correspond to the access apparatus described above.

The access functions 11 and 12 are radio access functions which provide the communication terminal 50 with connectivity to the communication system 1 using the radio access method. The access functions 11 and 12 include in-service-area access functions 11a and 12a and mobile anchor functions 11b and 12b.

The in-service-area access functions 11a and 12a are functions for managing communication terminals existing under the own access function. The in-service-area access functions 11a and 12a perform management of the connection for control signals with the communication terminal under the own access function, management of the radio resource for data communications, the tunnel management for bearers established with the mobile anchor functions 11b and 12b, and the like.

Additionally, the in-service-area access functions 11a and 12a include means for monitoring the amount of communication traffic of each communication terminal and, upon detecting a communication terminal which is in the non-power-saving state but has not performed communication for a certain period, for requesting the access GW function (C-plane) 20 to instruct the corresponding communication terminal to change to the power-saving state.

The mobile anchor functions 11b and 12b perform management of terminal points of bearers, the tunnel management for bearers established with the in-service-area access functions 11a and 12a and the like.

The non-power-saving state described above indicates a state where a tunnel for a bearer is established between the communication terminal 50 and the in-service-area access functions 11a and 12a, and between the in-service-area access functions 11a and 12a and the mobile anchor functions 11b and 12b. The power-saving state indicates a state where, although bearer terminal points are maintained in the communication terminal 50 and the mobile anchor functions 11b and 12b, a beater tunnel is released between the communication terminal 50 and the in-service-area access functions 11a and 12a, and between the in-service-area access functions 11a and 12a and the mobile anchor functions 11b and 12b.

The access GW function (C-plane) 20 is a control function for performing control so that the communication terminal 50 can receive mobile services via the access functions 11 and 12 such as authentication and handover between the access functions. The access GW function (C-plane) 20 includes a communication terminal management function 20a, an in-service-area access function management function 20b and a mobile anchor function management function 20c.

The communication terminal management function 20a is a function for performing movement management of the communication terminal 50. The communication terminal management function 20a manages the state of the communication terminal 50, the access function to which the communication terminal 50 is connected, the access function that terminates a bearer, and the like.

Additionally, the communication terminal management function 20a includes means for determining whether to perform a transition process to the power-saving state or to perform a switching process of a bearer termination point in accordance with the relationship between the access function to which the communication terminal 50 is connected and the access function terminating the bearer when the communication terminal 50 fulfills the condition for transition to the power-saving state.

The in-service-area access function management function 20b includes means for controlling the in-service-area access functions 11a and 12a included in the access functions 11 and 12 which is necessary to provide a bearer for the access from the communication terminal 50 to the communication system 1 and for data communication, such as management of a control channel for message exchange established with the in-service-area access functions 11a and 12a, a radio resource assignment request for the communication terminal, and a paging request.

The mobile anchor function management function 20c includes means for controlling the mobile anchor functions 11b and 12b included in the access functions 11 and 12 which is necessary to provide the communication terminal 50 with a bearer for data communication, such as management of a control channel for message exchange established with the mobile anchor functions 11b and 12b, and tunnel control for a bearer established with the in-service-area access functions 11a and 12a.

Figure 2:
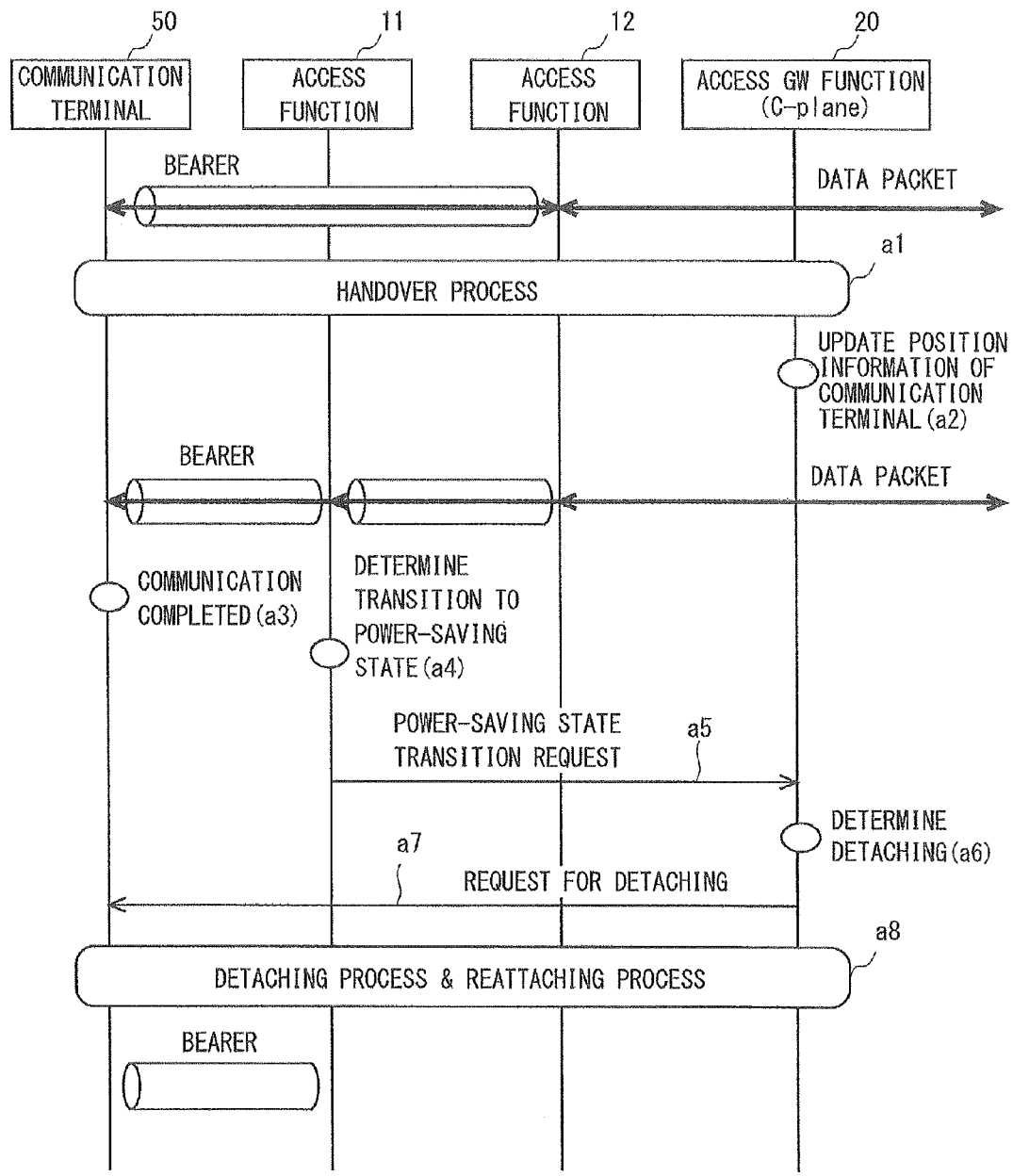
FIG. 2 is a sequence chart showing a handover procedure in the communication system according to the first exemplary embodiment of the present invention.
Figure 3:
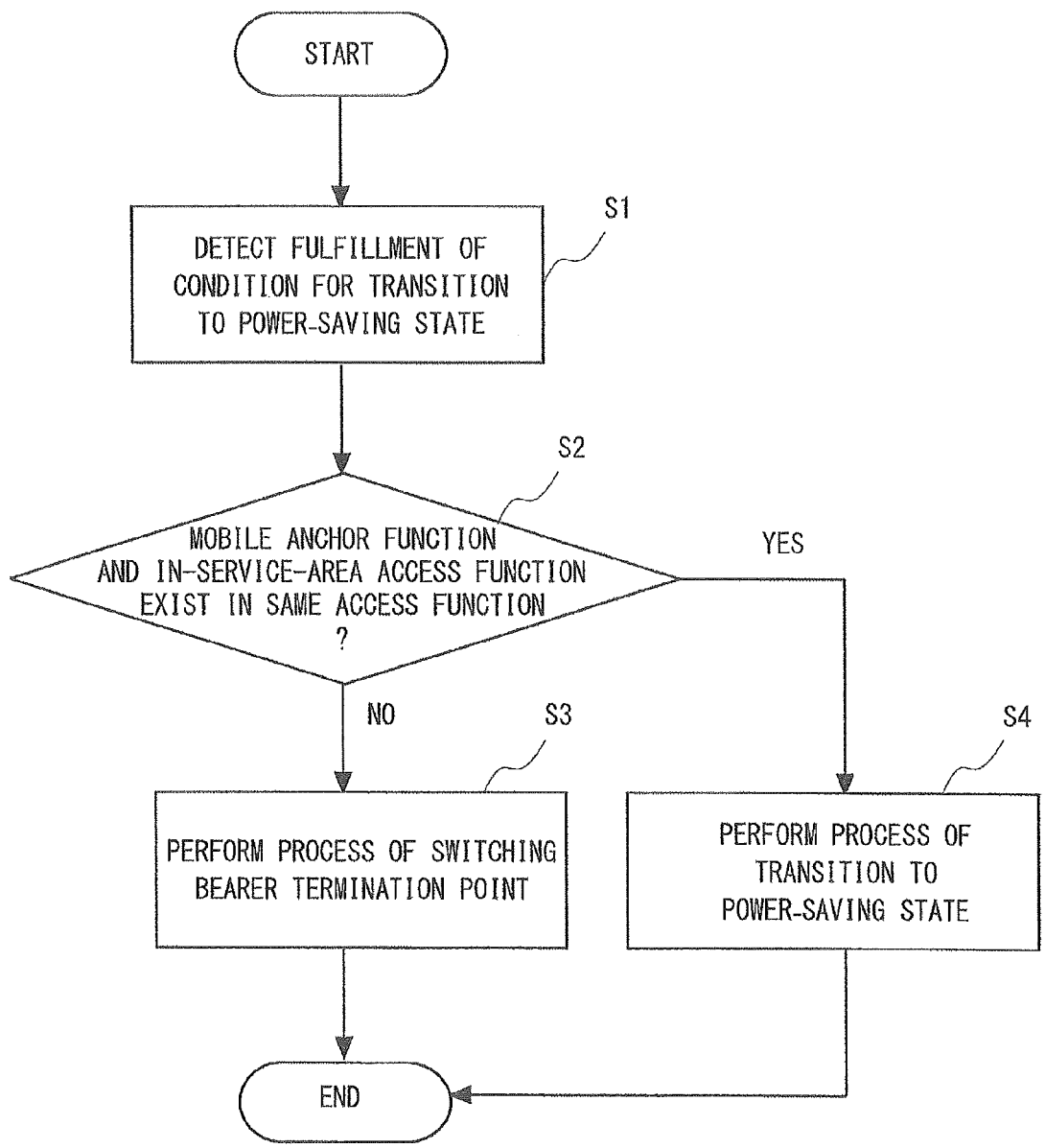
FIG. 3 is a flowchart showing a switching process of a termination point of a bearer in an access GW function (C-plane) shown in FIG. 1.

FIG. 2 is a sequence chart showing a handover procedure in the communication system according to the first exemplary embodiment of the present invention. FIG. 3 is a flowchart showing a switching process of a bearer termination point of the access GW function (C-plane) 20 shown in FIG. 1.

With reference to FIGS. 1-3, operations of the whole communication system according to this exemplary embodiment are explained. The process shown in FIG. 3 can be implemented by causing a CPU (Central Processing Unit) (not shown) which constitutes the access GW function (C-plane) 20 to execute a program.

In the communication system 1, FIG. 2 shows a sequence of a procedure through which the communication terminal 50 performs handover from the access function 12 to the access function 11 during communication and then the communication is terminated.

In the initial state, the communication terminal 50 performs communication via the access function 12. In this case, both the in-service-area access function and the mobile anchor function which are used for communication by the communication terminal 50 exist in the access function 12.

Referring to FIG. 2, the communication terminal 50 performs a handover process from the access function 12 to the access function 11 during communication (a1 in FIG. 2). Because the handover process is the same as the existing method except that the access function includes the mobile anchor function, the handover process is not explained in detail.

When the handover is completed, a bearer is established in the form in which the communication terminal 50 uses the access function 12 as the mobile anchor function and the access function 11 as the in-service-area access function. The access GW function (C-plane) 20 updates in-service-area access function information associated with the communication terminal 50 managed by the communication terminal management function from the access function 12 to the access function 11 (a2 in FIG. 2).

After that, when the communication is completed in the communication terminal 50 (a3 in FIG. 2), if the data communication in the communication terminal 50 has not been performed for a certain period, the in-service-area access function in the access function 11 notifies the access GW function (C-plane) 20 that the access GW function 20 should instruct the communication terminal 50 to change to the power-saving state (a4, a5 in FIG. 2).

When the access GW function (C-plane) 20 receives a request to change to the power-saving state in the communication terminal 50, the access GW function (C-plane) 20 determines whether or not to actually make a transition to the power-saving state in the communication terminal 50. The flow of the determination is explained with reference to FIG. 3.

Firstly, the access GW function (C-plane) 20 detects that the communication terminal 50 has fulfilled the condition for transition to the power-saving state (Step S1 in FIG. 3). In the process shown in FIG. 2, the communication terminal 50 fulfills the condition for transition to the power-saving state by receiving a message from the access function 11.

Then, the access GW function (C-plane) 20 determines whether the mobile anchor function and the in-service-area access function which are used by the communication terminal 50 exist in the same access function or not (Step S2 in FIG. 3).

When the above functions exist in the same access function (YES of Step S2 in FIG. 3), the access GW function (C-plane) 20 instructs the communication terminal 50 to change to the power-saving state (Step S4 in FIG. 3). When they do not exist in the same access function (NO of Step S2 in FIG. 3), the access GW function (C-plane) 20 performs a process of switching the bearer termination point used by the communication terminal 50 (Step S3 in FIG. 3).

In the example shown in FIG. 2, because the mobile anchor function and the in-service-area access function which are used by the communication terminal 50 do not exist in the same access function, the access GW function (C-plane) 20 performs the process of switching the bearer termination point.

Returning to the explanation of the process shown in FIG. 2, the access GW function (C-plane) 20 instructs the communication terminal 50 to perform detaching according to the flow of the process shown in FIG. 3 in order to perform the switching process of the bearer termination point (a8 in FIG. 2). In this case, the access GW function (C-plane) 20 instructs the communication terminal 50 to perform a reattaching process after detaching (a6 to a8 in FIG. 2).

The communication terminal 50 reestablishes the bearer terminated in the access function 11 according to the instruction from the access GW function (C-plane) 20 by performing reattaching after detaching (a8 in FIG. 2). Because the detaching process and the attaching process are substantially the same as the existing method shown in the above-mentioned Non-Patent Literature 1, these processes are not explained in detail.

In this exemplary embodiment, because only one bearer is established by the communication terminal 50, the detaching process is used as a process through which the access GW function (C-plane) 20 switches the bearer termination point. However, a bearer release process can be used instead of the detaching process. In this case, the access GW function (C-plane) 20 may instruct the communication terminal 50 to perform the process of establishing a bearer again after the bearer is released.

As described above, in this exemplary embodiment, the process for switching a termination point of the communication path is prompted at the timing of fulfilling the condition for transition to the power-saving state after the communication terminal performs the handover between the access functions. Thus, it is possible to avoid consumption of resources of a plurality of the access functions for a long period just for one communication terminal.

Figure 4:
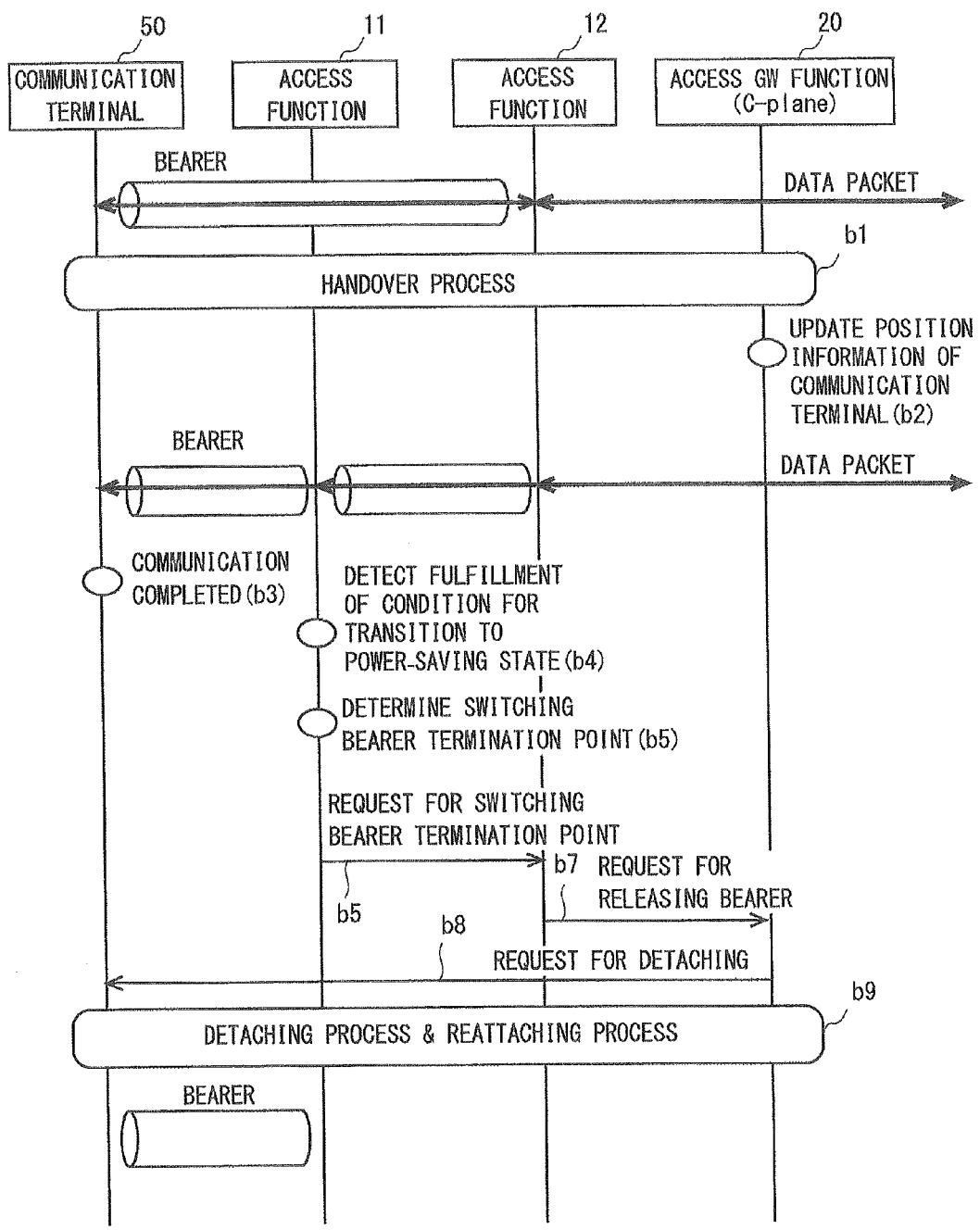
FIG. 4 is a sequence chart showing a handover procedure in a communication system according to a second exemplary embodiment of the present invention.

FIG. 4 is a sequence chart showing a handover procedure in a communication system according to a second exemplary embodiment of the present invention. The communication system according to the second exemplary embodiment of the present invention is configured in a way similar to that of the communication system according to the first exemplary embodiment of the present invention shown in FIG. 1.

The second exemplary embodiment of the present invention is different from the first exemplary embodiment of the present invention in that the access functions 11 and 12 include means for determining whether to perform a transition process to the power-saving state or to perform a switching process of a bearer termination point in accordance with the relationship between the access function connected to the communication terminal and the access function terminating the bearer when the communication terminal fulfills the condition for transition to the power-saving state. This determination means is included in the access GW function (C-plane) 20 in the first exemplary embodiment of the present invention. Because the rest of the configuration and operation of the second exemplary embodiment are the same as those in the above-mentioned first exemplary embodiment of the present invention, the rest of the configuration and operation are not explained in detail.

Hereinafter, with reference to FIG. 4, operations of the whole communication system according to the second exemplary embodiment of the present invention are explained. The operations which are the same as the operations in FIG. 2 explained in the first exemplary embodiment of the present invention are not explained in detail.

In the communication system 1 according to this exemplary embodiment, FIG. 4 shows a sequence of procedures through which the communication terminal 50 performs handover from the access function 12 to the access function 11 during communication and then the communication is terminated. However, because the processes through which the communication terminal 50 performs handover to the access function 11 and then terminates communication (b1 to b3 in FIG. 4) are the same as the operations shown in FIG. 2 (a1 to a3), the processes are not explained in detail.

When the communication is completed in the communication terminal 50 (b3 in FIG. 4), if the data communication in the communication terminal 50 has not been performed for a certain period, the in-service-area access function in the access function 11 determines that the communication terminal 50 has fulfilled the condition for transition to the power-saving state (b4 in FIG. 4).

The access function 11 then determines whether the mobile anchor function and the in-service-area access function which are used by the communication terminal 50 exist in the same access function. When they exist in the same access function, the access function 11 causes the communication terminal 50 to change to the power-saving state. When they do not exist in the same access function, the access function 11 performs a process of switching the bearer termination point used by the communication terminal 50 (b5, b6 in FIG. 4).

This determination logic is similar to the logic shown in FIG. 3. That is, the determination logic can be implemented by causing a CPU (not shown) which constitutes the access functions 11 and 12 to execute processes shown in FIG. 3.

In the example shown in FIG. 4, because the mobile anchor function and the in-service-area access function which are used by the communication terminal 50 do not exist in the same access function, the access function 11 performs the process of switching the bearer termination point.

Returning to the process shown in FIG. 4, the in-service-area access function in the access function 11 transmits a bearer termination-point switching request to the access function 12 including the mobile anchor function for a bearer used by the communication terminal 50 (b6 in FIG. 4).

When the access function 12 receives the bearer termination-point switching request, the access function 12 transmits a bearer release request to the access GW function (C-plane) 20 in order to release the bearer at the initiative of the mobile anchor function (b7 in FIG. 4). In this case, the access function 12 notifies the access GW function (C-plane) 20 so that the process of establishing a bearer is performed again after the bearer is released.

When the access GW function (C-plane) 20 receives the bearer release request, the access GW function (C-plane) 20 causes the communication terminal 50 to perform detaching to release the bearer established by the communication terminal 50 (b8 in FIG. 4). In this case, the access GW function (C-plane) 20 instructs the communication terminal 50 to perform a reattaching process after detaching. Although the detaching process and the reattaching process are performed as means for reestablishing the bearer, processes of releasing and reestablishing the bearer can be used instead of the detaching process and the reattaching process.

The communication terminal 50 re-establishes the bearer terminated in the access function 11 according to the instruction from the access GW function (C-plane) 20 by performing reattaching after detaching (b9 in FIG. 4).

Figure 5:
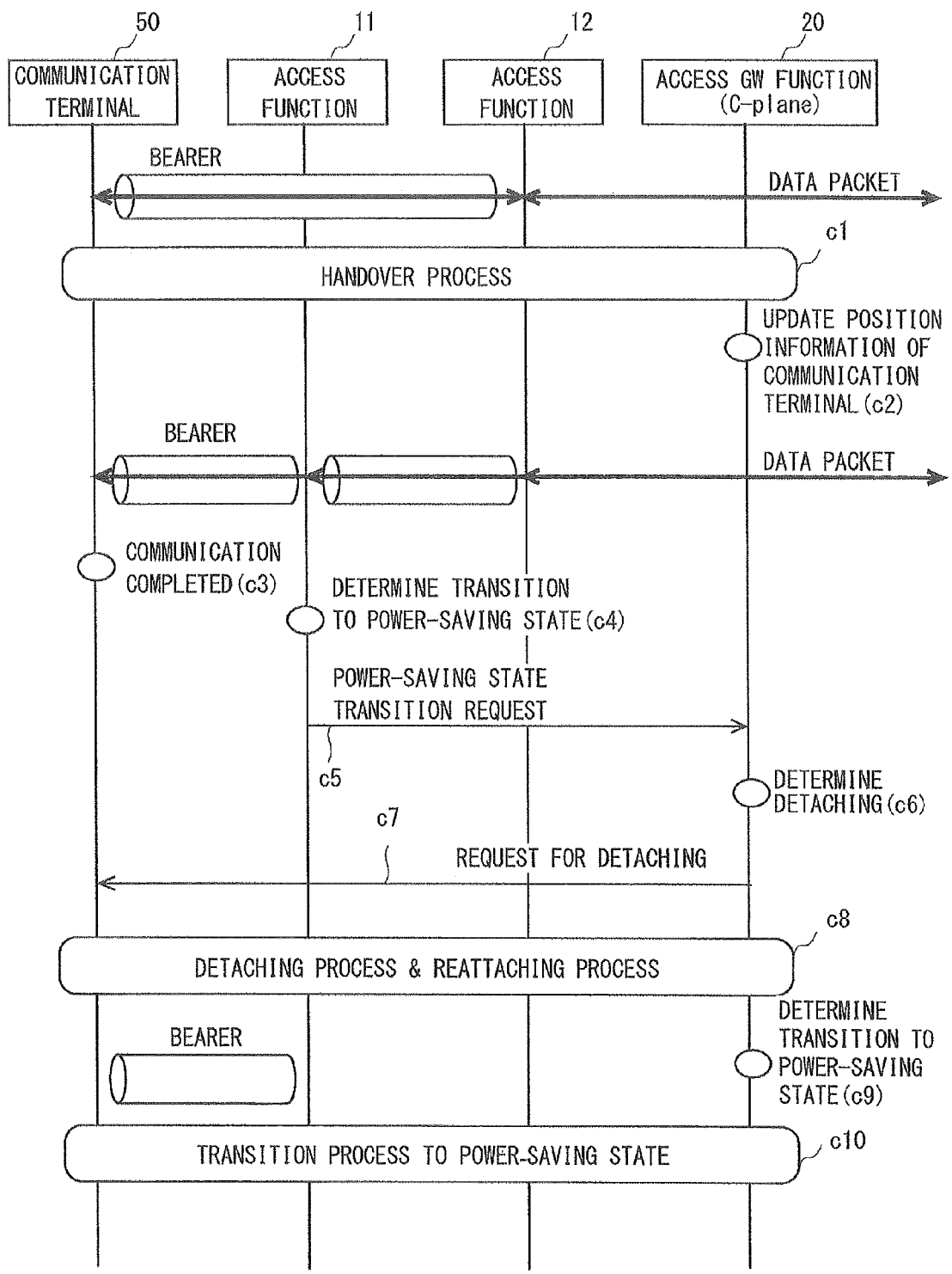
FIG. 5 is a sequence chart showing a handover procedure in a communication system according to a third exemplary embodiment of the present invention.

FIG. 5 is a sequence chart showing a handover procedure in a communication system according to a third embodiment of the present invention. The communication system according to the third embodiment of the present invention is configured in a way similar to that of the communication system according to the first exemplary embodiment of the present invention shown in FIG. 1.

The third exemplary embodiment of the present invention is characterized in that the communication terminal management function in the access GW function (C-plane) 20 includes means for further managing whether or not the communication terminal is performing the switching process of a bearer termination point for the state of the communication terminal, and means for performing the transition process to the power-saving state after completing the switching process of the bearer termination point, in addition to the above configurations of the above-mentioned first exemplary embodiment of the present invention. Because the rest of the configuration is the same as that in the first exemplary embodiment of the present invention, the rest of the configuration is not explained in detail.

With reference to FIG. 5, operations of the whole communication system according to the third exemplary embodiment of the present invention are explained. In FIG. 5, the operations which are the same as the operations in FIG. 2 explained in the first exemplary embodiment of the present invention are not explained in detail.

In the communication system 1 according to this exemplary embodiment, FIG. 5 shows a sequence of procedures through which the communication terminal 50 performs handover from the access function 12 to the access function 11 during communication and then the communication is terminated.

Because the processes through which the communication terminal 50 performs handover to the access function 11 and then the access GW function (C-plane) 20 receives a power-saving state transition request from the access function 11 (c1 to c5 in FIG. 5) are the same as the processes shown in FIG. 2, the processes are not explained in detail.

When the access GW function (C-plane) 20 receives the power-saving state transition request from the access function 11, the access GW function (C-plane) 20 causes the communication terminal 50 to perform detaching according to the flow of the process shown in FIG. 3 in order to perform the switching process of the bearer termination point (c6, c7 in FIG. 5). In this case, the access GW function (C-plane) 20 instructs the communication terminal 50 to perform a reattaching process after detaching.

The access GW function (C-plane) 20 registers that the communication terminal 50 is performing the switching process of the bearer termination point for the state of the communication terminal 50, and continues to maintain management information of the communication terminal 50 after detaching is completed.

The communication terminal 50 reestablishes the bearer terminated in the access function 11 according to the instruction from the access GW function (C-plane) 20 by performing reattaching after detaching (c8 in FIG. 5). Because the detaching process and the attaching process are substantially the same as the existing method shown in the above-mentioned Non Patent Literature 1, these processes are not explained in detail.

When the communication terminal 50 completes the reattaching process, the access GW function (C-plane) 20 determines that the switching process of the bearer termination point is completed because the communication terminal 50 is in a state where the communication terminal 50 is performing the switching process of the bearer termination point, and then performs a process for changing the communication terminal 50 to the power-saving state (c9, c10 in FIG. 5).

This exemplary embodiment has been explained based on the configuration and operation of the communication system according to the first exemplary embodiment of the present invention. However, this exemplary embodiment can be applied to the second exemplary embodiment of the present invention.

As described above, in this exemplary embodiment, when the communication terminal completes the switching process of the bearer termination point, the transition process to the power-saving state is immediately performed. Thus, it is not necessary to monitor traffic with the access function to determine whether or not to permit transition to the power-saving state.

Therefore, in this exemplary embodiment, the period during which the communication terminal is in the power-saving state becomes longer compared with the first and second exemplary embodiments of the present invention. This leads to an advantage that the amount of information which is managed by the in-service-area access function in the access function is reduced as well as reducing power consumption of the communication terminal.

Figure 6:
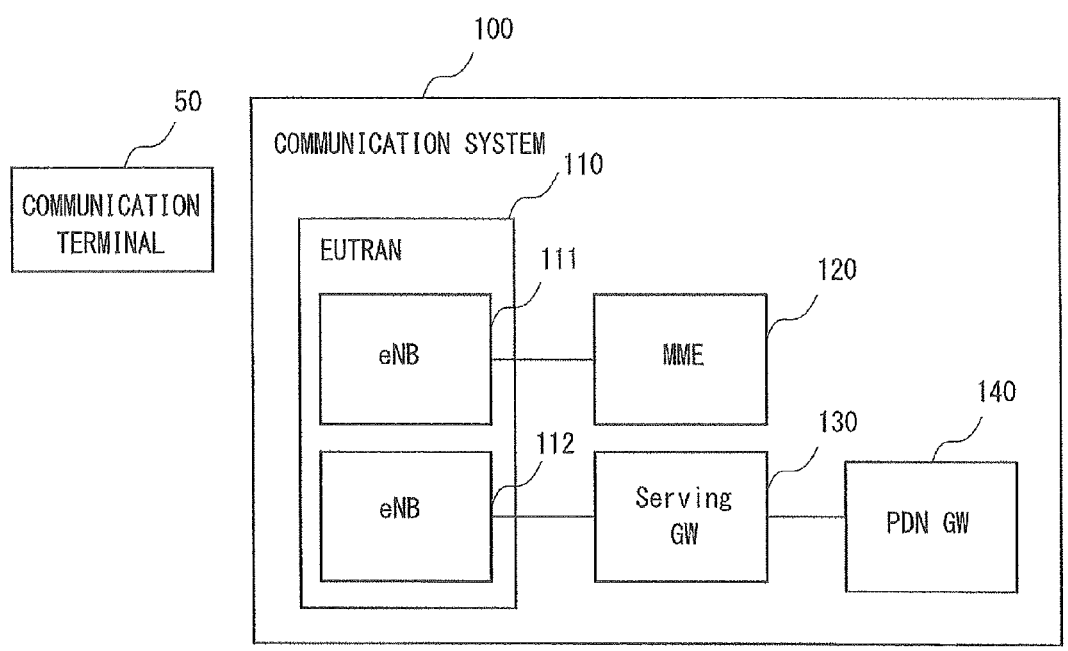
FIG. 6 is a block diagram showing an example of a communication system related to the invention.
Figure 7:
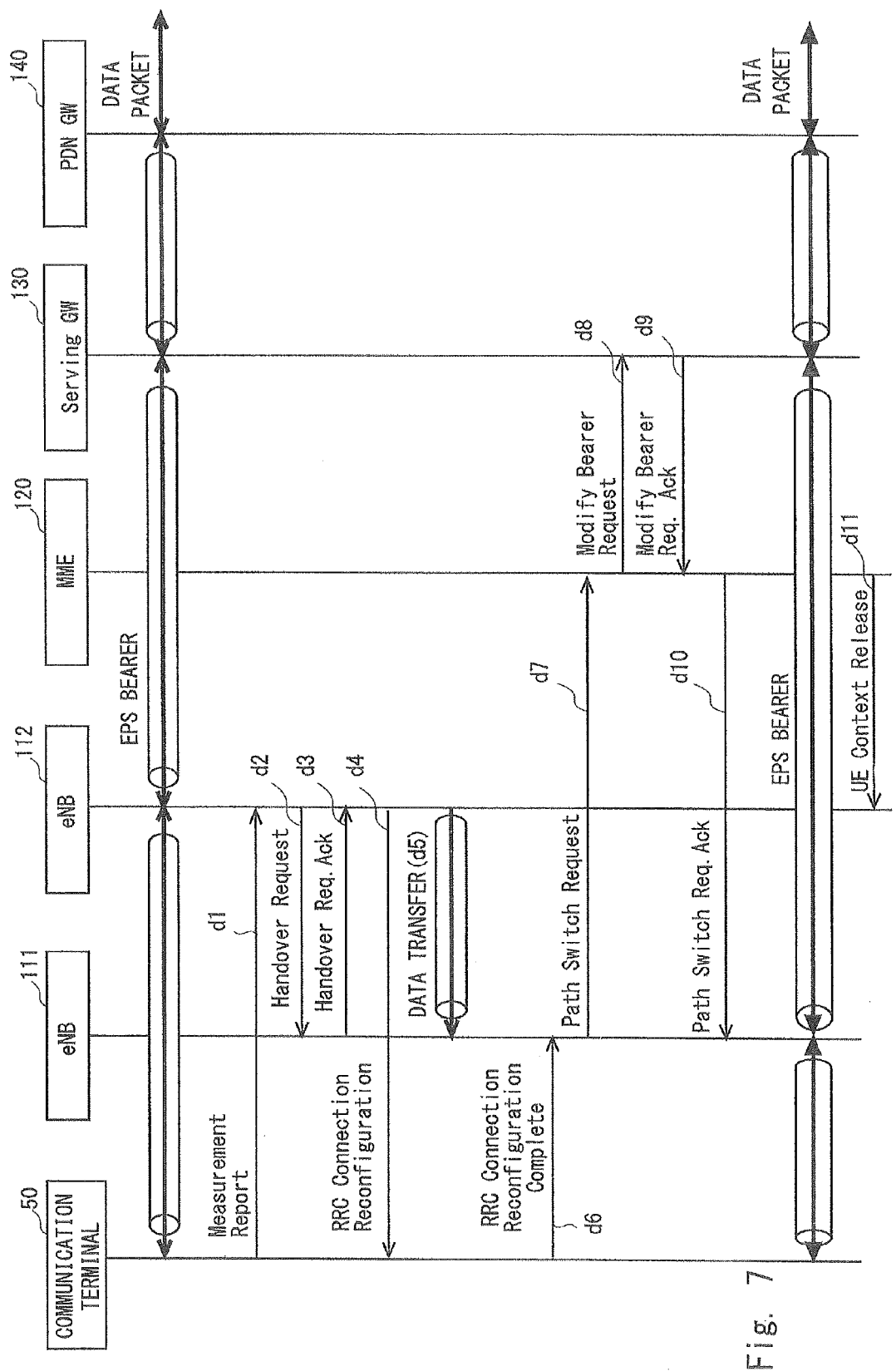
FIG. 7 is a sequence chart showing a handover procedure in the communication system shown in FIG. 6.
Figure 8:
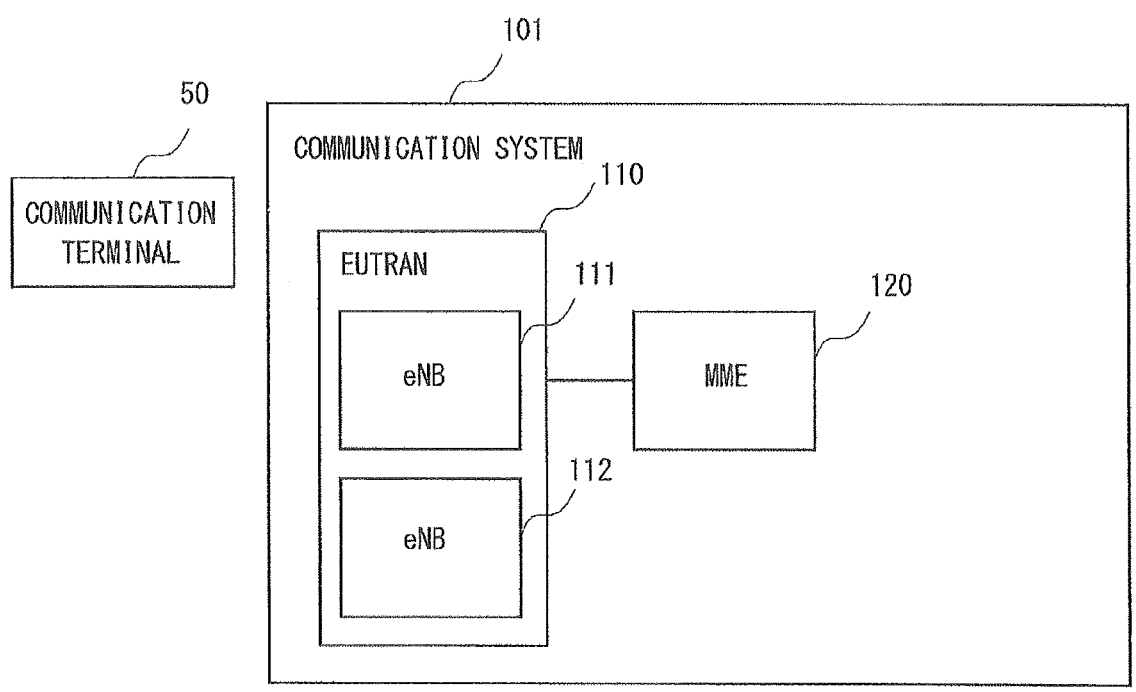
FIG. 8 is a block diagram showing another example of a communication system related to the invention.
Figure 9:
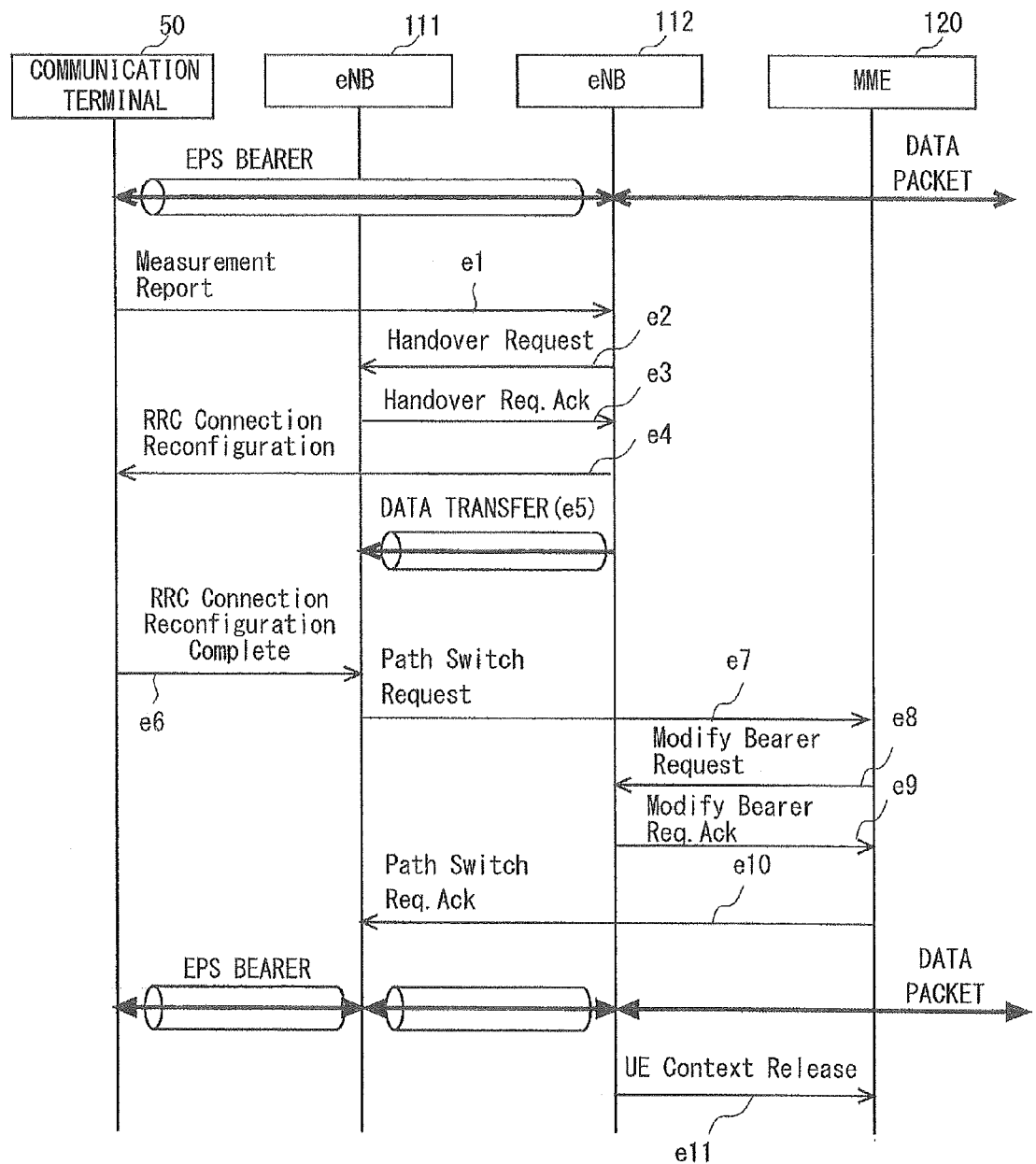
FIG. 9 is a sequence chart showing a handover procedure in the communication system shown in FIG. 8.

In the above-mentioned first to third exemplary embodiments of the present invention, the access functions 11 and 12 and the access GW function (C-plane) 20 are explained. The access functions 11 and 12 correspond to eNB (evolved Node B) 111 and 112 in EUTRAN (Evolved Universal Terrestrial Radio Access Network) 110 shown in FIG. 6. The access GW function (C-plane) 20 corresponds to MME (Mobility Management Entity) 120.

That is, in the first to third exemplary embodiments of the present invention, it is assumed that the communication system uses LTE (long Term Evolution) as an access method.

The eNBs 111 and 112 in EUTRAN 110 include gateway functions such as Serving GW and PDN (Packet Data Networks) GW.

Furthermore, the power-saving state transition request message corresponds to S1 UE (User Equipment) Context Release Request. The detaching process performed at the initiative of the access GW function (C-plane) 20 corresponds to MME initiates Detach. The attaching process corresponds to E-UTRAN Initial Attach. The bearer release process at the initiative of the mobile anchor function corresponds to PDN GW initiated bearer deactivation.

Moreover, the above-mentioned first to third exemplary embodiments of the present invention are described based on the assumption that each of the access functions corresponds to an individual eNB. However, if multiple access functions are supported by one eNB apparatus like a multi-sector, whether the switching process of the bearer termination point is performed or not may be determined based on whether the in-service-area access function and the mobile anchor function are disposed in the same eNB apparatus. In this case, for example, it is possible to determine the above based on whether IP (Internet Protocol) addresses of eNBs including the in-service-area access function and the mobile anchor function are the same as each other.

As described above, in the present invention, the process of switching a termination point of the communication path is prompted when the communication terminal performs the handover between the access apparatuses. Thus, in the communication system where the access apparatus includes a termination function, it is possible to avoid consumption of resources of a plurality of the access apparatuses for a long period just to provide a communication path to one communication terminal.

Moreover, in the present invention, the timing of fulfilling the condition for transition to the power-saving state is used as the timing of performing a switching of the termination point of a communication path. Thus, it is possible to reduce the possibility that the communication performed by the communication terminal is broken halfway when the switching of termination point of a communication path is performed.

The whole or part of the exemplary embodiments disclosed above can be described by, but not limited to, the following supplementary notes.

[Supplementary Note 1]

An access control apparatus that controls an access apparatus comprising means for terminating a communication path with a communication terminal, the access control apparatus comprising:

determination means for determining whether or not to prompt a switching process of the communication path in accordance with a movement history of the communication terminal based on an operation state of the communication terminal, wherein the movement history indicates whether or not an access apparatus at a termination point of the communication path is the same as an access apparatus to which the communication terminal is connected.

[Supplementary Note 2]

An access control apparatus according to Supplementary note 1, wherein the operation state of the communication terminal indicates whether or not the communication terminal fulfills a condition for transition to a power-saving state.

[Supplementary Note 3]

An access control apparatus according to Supplementary note 1 or 2, wherein an action to prompt the switching process of the communication path is a detaching process.

[Supplementary Note 4]

An access control apparatus according to Supplementary note 1 or 2, wherein an action to prompt the switching process of the communication path is a communication path release process.

[Supplementary Note 5]

An access control apparatus according to any one of Supplementary notes 1 to 4, wherein a transition to a power-saving state is performed after the switching process of the communication path without wait time.

[Supplementary Note 6]

An access control apparatus that controls an access apparatus comprising means for terminating a communication path with a communication terminal, the access control apparatus comprising:

determination means for determining whether or not to prompt a switching process of the communication path in accordance with a movement history of the communication terminal based on an operation state of the communication terminal, wherein the operation state of the communication terminal indicates whether or not the communication terminal fulfills a condition for transition to a power-saving state.

[Supplementary Note 7]

An access control apparatus that controls an access apparatus comprising means for terminating a communication path with a communication terminal, the access control apparatus comprising:

determination means for determining whether or not to prompt a switching process of the communication path in accordance with a movement history of the communication terminal based on an operation state of the communication terminal, wherein an action to prompt the switching process of the communication path is a detaching process.

[Supplementary Note 8]

An access control apparatus that controls an access apparatus comprising means for terminating a communication path with a communication terminal, the access control apparatus comprising:

determination means for determining whether or not to prompt a switching process of the communication path in accordance with a movement history of the communication terminal based on an operation state of the communication terminal, and wherein an action to prompt the switching process of the communication path is a communication path release process.

[Supplementary Note 9]

An access apparatus comprising:

means for terminating a communication path with a communication terminal; and determination means for determining whether or not to prompt a switching process of the communication path in accordance with a movement history of the communication terminal based on an operation state of the communication terminal, wherein the movement history indicates whether or not an access apparatus of termination point of the communication path is the same as an access apparatus to which the communication terminal is connected.

[Supplementary Note 10]

An access apparatus according to Supplementary note 9, wherein the operation state of the communication terminal indicates whether or not the communication terminal fulfills a condition for transition to a power-saving state.

[Supplementary Note 11]

An access apparatus according to Supplementary note 9 or 10, wherein an action to prompt the switching process of the communication path is a detaching process.

[Supplementary Note 12]

An access apparatus according to Supplementary note 9 or 10, wherein an action to prompt the switching process of the communication path is a communication path release process.

[Supplementary Note 13]

An access apparatus according to any one of Supplementary notes 9 to 12, wherein a transition to a power-saving state is performed after the switching process of the communication path without wait time.

[Supplementary Note 14]

An access apparatus comprising:

means for terminating a communication path with a communication terminal; and determination means for determining whether or not to prompt a switching process of the communication path in accordance with a movement history of the communication terminal based on an operation state of the communication terminal, wherein the operation state of the communication terminal indicates whether or not the communication terminal fulfills a condition for transition to a power-saving state.

[Supplementary Note 15]

An access apparatus comprising:

means for terminating a communication path with a communication terminal; and determination means for determining whether or not to prompt a switching process of the communication path in accordance with a movement history of the communication terminal based on an operation state of the communication terminal, wherein an action to prompt the switching process of the communication path is a detaching process.

[Supplementary Note 16]

An access apparatus comprising:

means for terminating a communication path with a communication terminal; and determination means for determining whether or not to prompt a switching process of the communication path in accordance with a movement history of the communication terminal based on an operation state of the communication terminal, wherein an action to prompt the switching process of the communication path is a communication path release process.

[Supplementary Note 17]

A communication path control method used for a communication system comprising an access apparatus comprising means for terminating a communication path with a communication terminal, and an access control apparatus that controls the access apparatus, the communication path control method comprising:

determining whether or not to prompt a switching process of the communication path in accordance with a movement history of the communication terminal based on an operation state of the communication terminal, wherein the movement history indicates whether or not an access apparatus of termination point of the communication path is the same as an access apparatus to which the communication terminal is connected.

[Supplementary Note 18]

The communication path control method according to Supplementary note 17, wherein the operation state of the communication terminal indicates whether or not the communication terminal fulfills a condition for transition to a power-saving state.

[Supplementary Note 19]

The communication path control method according to Supplementary note 17 or 18, wherein an action to prompt the switching process of the communication path is a detaching process.

[Supplementary Note 20]

The communication path control method according to Supplementary note 17 or 18, wherein an action to prompt the switching process of the communication path is a communication path release process.

[Supplementary Note 21]

The communication path control method according to any one of Supplementary notes 17 to 20, wherein a transition to a power-saving state is performed after the switching process of the communication path without wait time.

[Supplementary Note 22]

A communication path control method used for a communication system comprising an access apparatus comprising means for terminating a communication path with a communication terminal, and an access control apparatus that controls the access apparatus, the communication path control method comprising:

determining whether or not to prompt a switching process of the communication path in accordance with a movement history of the communication terminal based on an operation state of the communication terminal, wherein the operation state of the communication terminal indicates whether or not the communication terminal fulfills a condition for transition to a power-saving state.

[Supplementary Note 23]

A communication path control method used for a communication system comprising an access apparatus comprising means for terminating a communication path with a communication terminal, and an access control apparatus that controls the access apparatus, the communication path control method comprising:

determining whether or not to prompt a switching process of the communication path in accordance with a movement history of the communication terminal based on an operation state of the communication terminal, wherein an action to prompt the switching process of the communication path is a detaching process.

[Supplementary Note 24]

A communication path control method used for a communication system comprising an access apparatus comprising means for terminating a communication path with a communication terminal, and an access control apparatus that controls the access apparatus, the communication path control method comprising:

determining whether or not to prompt a switching process of the communication path in accordance with a movement history of the communication terminal based on an operation state of the communication terminal, wherein an action to prompt the switching process of the communication path is a communication path release process.

[Supplementary Note 25]

A non-transitory computer readable medium storing a program that is executed by a central processing unit of any one of an access apparatus comprising means for terminating a communication path with a communication terminal and an access control apparatus that controls the access apparatus in a communication system comprising the access apparatus and the access control apparatus, the program comprising:

a determination process of determining whether or not to prompt a switching process of the communication path in accordance with a movement history of the communication terminal when the communication terminal fulfills a condition for transition to a power-saving state.

The above-mentioned program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present invention has been explained with reference to the exemplary embodiments, the present invention is not limited by the above exemplary embodiments. Various modifications, obvious to those in the art, can be made to the configurations and details of the present invention within the scope of the invention.

This application is based upon and claims the benefit of priority from Japanese patent application No. 2012-117069, filed on May 23, 2012, the disclosure of which is incorporated herein in its entirety by reference.

INDUSTRIAL APPLICABILITY

The present invention can be also applied to other mobile communication systems as well as the communication system using LTE as an access method. Examples of other mobile communication systems include systems defined in W-CDMA (Wideband Code Division Multiple Access), WiMAX (Worldwide Interroperability for Microwave Access) and 3GPP2 (3rd Generation Partnership Project 2).

REFERENCE SIGNS LIST

1 COMMUNICATION SYSTEM
10 ACCESS NETWORK
11, 12 ACCESS FUNCTIONS
11a, 12a IN-SERVICE-AREA ACCESS FUNCTIONS
11b, 12b MOBILE ANCHOR FUNCTIONS
20 ACCESS GW FUNCTION (C-PLANE)
20a COMMUNICATION TERMINAL MANAGEMENT FUNCTION
20b IN-SERVICE-AREA ACCESS FUNCTION MANAGEMENT FUNCTION
20c MOBILE ANCHOR FUNCTION MANAGEMENT FUNCTION
50 COMMUNICATION TERMINAL

The invention claimed is:

1. A communication system comprising an access apparatus that can be a termination point of a communication path with a communication terminal, and an access control apparatus that controls the access apparatus, the communication system comprising:

after a handover is completed and the communication is completed in the communication terminal, a processor determines whether or not to prompt a switching process of the termination point of the communication path in accordance with a movement history of the communication terminal based on an operation state of the communication terminal.

2. The communication system according to claim 1, wherein the movement history indicates whether or not an access apparatus that is a termination point of the communication path is the same as an access apparatus to which the communication terminal is connected, and, when the access apparatus that is the termination point of the communication path is not the same the access apparatus to which the communication terminal is connected, the processor prompts the switching process of the termination point of the communication path.

3. The communication system according to claim 1, wherein the operation state of the communication terminal indicates whether or not the communication terminal fulfills a condition for transition to a power-saving state, the power-saving state indicates a state where, although the terminal point is maintained in the communication terminal and the communication path is released, and, when the operation state indicates the communication terminal fulfills the condition for transition to the power-saving state, the processor determines whether or not to prompt the switching process of the termination point of the communication path.

4. The communication system according to claim 1, wherein an action to prompt the switching process of the communication path comprises a detaching process.

5. The communication system according to claim 1, wherein an action to prompt the switching process of the communication path comprises a communication path release process.

6. The communication system according to claim 1, wherein a transition to a power-saving state is performed after the switching process of the communication path without wait time.

7. The communication system according to claim 1, wherein any one of the access control apparatus and the access apparatus comprises the processor.

8. An access control apparatus that controls an access apparatus that can be a termination point of a communication path with a communication terminal, the access control apparatus comprising:

after a handover is completed and the communication is completed in the communication terminal, a processor determines whether or not to prompt a switching process of the termination point of the communication path in accordance with a movement history of the communication terminal based on an operation state of the communication terminal.

9. The access control apparatus according to claim 8, wherein the movement history indicates whether or not an access apparatus that is a termination point of the communication path is the same as an access apparatus to which the communication terminal is connected, and, when the access apparatus that is the termination point of the communication path is not the same the access apparatus to which the communication terminal is connected, the processor prompts the switching process of the termination point of the communication path.

10. The access control apparatus according to claim 8, wherein the operation state of the communication terminal indicates whether or not the communication terminal fulfills a condition for transition to a power-saving state, the power-saving state indicates a state where, although the terminal point is maintained in the communication terminal and the communication path is released, and, when the operation state indicates the communication terminal fulfills the condition for transition to the power-saving state, the processor determines whether or not to prompt the switching process of the termination point of the communication path.

11. The access control apparatus according to claim 8, wherein an action to prompt the switching process of the communication path comprises a detaching process.

12. The access control apparatus according to claim 8, wherein an action to prompt the switching process of the communication path comprises a communication path release process.

13. The access control apparatus according to claim 8, wherein a transition to a power-saving state is performed after the switching process of the communication path without wait time.

14. An access apparatus comprising:
  a termination point of a communication path with a communication terminal; and
  after a handover is completed and the communication is completed in the communication terminal, a processor that determines whether or not to prompt a switching process of the termination point of the communication path in accordance with a movement history of the communication terminal based on an operation state of the communication terminal.

15. The access apparatus according to claim 14, wherein the movement history indicates whether or not an access apparatus that is a termination point of the communication path is the same as an access apparatus to which the communication terminal is connected, and when the access apparatus that is the termination point of the communication path is not the same the access apparatus to which the communication terminal is connected, the processor prompts the switching process of the termination point of the communication path.

16. The access apparatus according to claim 14, wherein the operation state of the communication terminal indicates whether or not the communication terminal fulfills a condition for transition to a power-saving state, the power-saving state indicates a state where, although the terminal point is maintained in the communication terminal and the communication path is released, and, when the operation state indicates the communication terminal fulfills the condition for transition to the power-saving state, the processor determines whether or not to prompt the switching process of the termination point of the communication path.

17. The access apparatus according to claim 14, wherein an action to prompt the switching process of the communication path comprises a detaching process.

18. The access apparatus according to claim 14, wherein an action to prompt the switching process of the communication path comprises a communication path release process.

19. The access apparatus according to claim 14, wherein a transition to a power-saving state is performed after the switching process of the communication path without wait time.

20. A communication path control method used for a communication system comprising an access apparatus that can be a termination point of a communication path with a communication terminal, and an access control apparatus that controls the access apparatus, the communication path control method comprising:
  after a handover is completed and the communication is completed in the communication terminal, determining, by a processor, whether or not to prompt a switching process of the termination point of the communication path in accordance with a movement history of the communication terminal based on an operation state of the communication terminal.

21. The communication path control method according to claim 20, wherein the movement history indicates whether or not an access apparatus that is a termination point of the communication path is the same as an access apparatus to which the communication terminal is connected, and, when the access apparatus that is the termination point of the communication path is not the same the access apparatus to which the communication terminal is connected, the processor prompts the switching process of the termination point of the communication path.

22. The communication path control method according to claim 20, wherein the operation state of the communication terminal indicates whether or not the communication terminal fulfills a condition for transition to a power-saving state, the power-saving state indicates a state where, although the terminal point is maintained in the communication terminal and the communication path is released, and, when the operation state indicates the communication terminal fulfills the condition for transition to the power-saving state, the processor determines whether or not to prompt the switching process of the termination point of the communication path.

23. The communication path control method according to claim 20, wherein an action to prompt the switching process of the communication path comprises a detaching process.

24. The communication path control method according to claim 20, wherein an action to prompt the switching process of the communication path comprises a communication path release process.

25. The communication path control method according to claim 20, wherein a transition to a power-saving state is performed after the switching process of the communication path without wait time.

26. A non-transitory computer readable medium storing a program that is executed by a central processing unit of any one of an access apparatus that can be a termination point of a communication path with a communication terminal and an access control apparatus that controls the access apparatus in a communication system comprising the access apparatus and the access control apparatus, the program comprising:
  after a handover is completed and the communication is completed in the communication terminal, a determination process of determining whether or not to prompt a switching process of the termination point of the communication path in accordance with a movement history of the communication terminal when the communication terminal fulfills a condition for transition to a power-saving state.

* * * * *